US010019723B2

(12) United States Patent
Kenney et al.

(10) Patent No.: US 10,019,723 B2
(45) Date of Patent: Jul. 10, 2018

(54) SYSTEMS AND METHODS FOR PROVIDING A REDEEMABLE COMMERCE OBJECT

(71) Applicant: CAPITAL ONE SERVICES, LLC, McLean, VA (US)

(72) Inventors: Ni Kenney, Glen Allen, VA (US); Andrew Kenney, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 15/667,107

(22) Filed: Aug. 2, 2017

(65) Prior Publication Data

US 2017/0345002 A1 Nov. 30, 2017

Related U.S. Application Data

(63) Continuation of application No. 15/606,430, filed on May 26, 2017.

(60) Provisional application No. 62/343,667, filed on May 31, 2016.

(51) Int. Cl.

| | |
|---|---|
| ***G06Q 40/00*** | (2012.01) |
| ***G06Q 30/02*** | (2012.01) |
| ***G06Q 20/40*** | (2012.01) |
| ***G06Q 20/10*** | (2012.01) |
| ***G06Q 30/06*** | (2012.01) |

(52) U.S. Cl.

CPC ......... *G06Q 30/0215* (2013.01); *G06Q 20/10* (2013.01); *G06Q 20/40* (2013.01); *G06Q 20/4014* (2013.01); *G06Q 30/0601* (2013.01)

(58) Field of Classification Search

CPC .. G06Q 20/414; G06Q 20/10; G06Q 30/0215; G06Q 30/0601

See application file for complete search history.

(56) References Cited

U.S. PATENT DOCUMENTS

| | | | | |
|---|---|---|---|---|
| 8,016,185 B2 * | 9/2011 | Modi | G06Q 20/02 | 235/379 |
| 8,249,965 B2 * | 8/2012 | Tumminaro | G06Q 20/12 | 705/35 |
| 8,407,140 B2 * | 3/2013 | Ayala | G06Q 40/02 | 235/385 |
| 2004/0111367 A1 * | 6/2004 | Gallagher | G06Q 20/0855 | 705/39 |
| 2006/0149667 A1 * | 7/2006 | Barry | G06Q 20/04 | 705/39 |
| 2008/0140564 A1 * | 6/2008 | Tal | G06O 20/02 | 705/39 |
| 2011/0066550 A1 * | 3/2011 | Shank | G06Q 20/1085 | 705/43 |

(Continued)

*Primary Examiner* — Lalita M Hamilton

(74) *Attorney, Agent, or Firm* — Troutman Sanders LLP; Christopher J. Forstner; John A. Morrissett

(57) ABSTRACT

A system includes one or more memory devices storing instructions, and one or more processors configured to execute the instructions to perform steps of a method. The system may enable a first user to select a redeemable commerce object to be placed within a web page. The system may create the web page that includes a representation of the redeemable commerce object. A second user may be enabled to view the web page and select the redeemable commerce object in order to redeem it. The system may facilitate the transfer of value from to the second user upon redeeming the redeemable commerce object.

21 Claims, 6 Drawing Sheets

START
400
RECEIVE OBJECT PLACEMENT REQUEST FROM FIRST COMPUTING DEVICE COMPRISING ID DATA ASSOCIATED WITH FIRST ACCOUNT 402
DETERMINE WHETHER AT LEAST A PORTION OF THE ID DATA CORRESPONDS TO ACCOUNT ID DATA 404
ACTIVATE LINK TO WEB PAGE CONFIGURED TO RECEIVE REDEEMABLE COMMERCE OBJECT 406
PROVIDE REDEEMABLE COMMERCE OBJECT ON WEB PAGE 408
RECEIVE, FROM SECOND COMPUTING DEVICE, OBJECT SELECTION REQUEST COMPRISING ID DATA ASSOCIATED WITH SECOND ACCOUNT 410
TRANSFER PAYMENT FROM FIRST ACCOUNT TO SECOND ACCOUNT 412
PROVIDE A CONFIRMATION NOTIFICATION TO FIRST COMPUTING DEVICE 414
RECEIVE AUTHENTICATION DATA FROM SECOND COMPUTING DEVICE 416
418 AUTHENTICATION DATA CORRESPONDS TO STORED AUTHENTICATION DATA? NO 422
YES
ALLOW PAYMENT TRANSFER FROM FIRST ACCOUNT TO SECOND ACCOUNT 420
END

(56) References Cited

U.S. PATENT DOCUMENTS

2011/0213675 A1* 9/2011 Friedman ............... G06Q 30/02 705/26.7
2012/0284147 A1* 11/2012 Nie ........................ G06Q 20/02 705/26.41
2013/0013516 A1* 1/2013 Hamilton ............... G06Q 40/02 705/75
2013/0260889 A1* 10/2013 LeMay ................... G07F 17/32 463/42
2013/0332337 A1* 12/2013 Tran ..................... G06Q 40/025 705/38
2013/0347074 A1* 12/2013 Vellozo Luz ......... G06F 21/606 726/4
2015/0112866 A1* 4/2015 Muthu ................. G06Q 20/385 705/44
2016/0125412 A1* 5/2016 Cannon .............. G06Q 20/4014 705/44
2016/0180318 A1* 6/2016 Brooks .................. G06Q 20/32 705/39
2016/0292737 A1* 10/2016 Barnes, Jr. ......... G06Q 10/1053
2016/0321625 A1* 11/2016 Gilliam, III ......... G06Q 20/023
2016/0328700 A1* 11/2016 Bortolotto .......... G06Q 20/3226

* cited by examiner

SYSTEMS AND METHODS FOR PROVIDING A REDEEMABLE COMMERCE OBJECT

CROSS REFERENCE TO RELATED APPLICATIONS

This application is a continuation of U.S. patent application Ser. No. 15/606,430, filed 26 May 2017, entitled "Systems and Methods for Providing a Redeemable Commerce Object", which claims the benefit of U.S. Provisional Application No. 62/343,667, filed 31 May 2016, the entire contents and substance of which are hereby incorporated by reference.

FIELD OF THE INVENTION

The presently disclosed subject matter relates generally to systems and methods for providing a redeemable commerce object, particularly systems and methods for providing a redeemable commerce object on a web page.

BACKGROUND

Giving gifts to a host, friends, and relatives are a common custom in many countries. Many gifts have a monetary value (e.g., cash, gift card, etc.), others have a sentimental value (e.g., photographs of family, romantic card, etc.), and some have both (e.g., dad's antique coin collection). As families and friends spread further apart geographically, it often becomes difficult for a gift giver to provide a gift to a recipient and to capture the experience of in-person gift giving.

E-commerce payment systems and e-card systems provide one way to deliver gifts despite inconvenient geographic distance between parties, but are typically limited to being purely monetary (e.g., person-to-person "P2P" payments) or sentimental (e.g., greeting card). Further, the gift giving experience for the gift provider and the gift receiving experience for the recipient when using existing e-commerce payment systems and e-card systems is usually boring and unimaginative when compared to in-person gift giving, and enhancing the experience of the gift provider and the recipient may add value and satisfaction to the gift giving process regardless of the type of gift.

Accordingly, there is a need for improved devices, systems, and methods that enable electronic gift-giving, and embodiments of the present disclosure are directed to this and other considerations.

SUMMARY

Disclosed embodiments provide systems and methods for providing a redeemable commerce object (e.g., providing a redeemable commerce object on a web page).

Consistent with the disclosed embodiments, the system may include one or more memory devices storing instructions, and one or more processors configured to execute the instructions to perform steps of a method to provide a redeemable commerce object on a webpage. The system may execute the instructions to receive an object placement request, which includes identification data associated with a first account, from a first computing device. In response, the system may determine whether at least a portion of the identification data corresponds to account identification data stored in an account identification database. Based on the determination, the system may activate a link to a web page configured to receive a redeemable commerce object, and provide the redeemable commerce object on the web page. The system may then receive an object selection request, which includes identification data associated with a second account, associated with the redeemable commerce object from a second computing device that has accessed the web page via the activated link. Based on the object selection request, the system may transfer payment from the first account to the second account to redeem the commerce object.

Consistent with the disclosed embodiments, methods for providing a redeemable commerce object on a web page are also provided.

Further features of the disclosed design, and the advantages offered thereby, are explained in greater detail hereinafter with reference to specific embodiments illustrated in the accompanying drawings, wherein like elements are indicated be like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Figure 1:
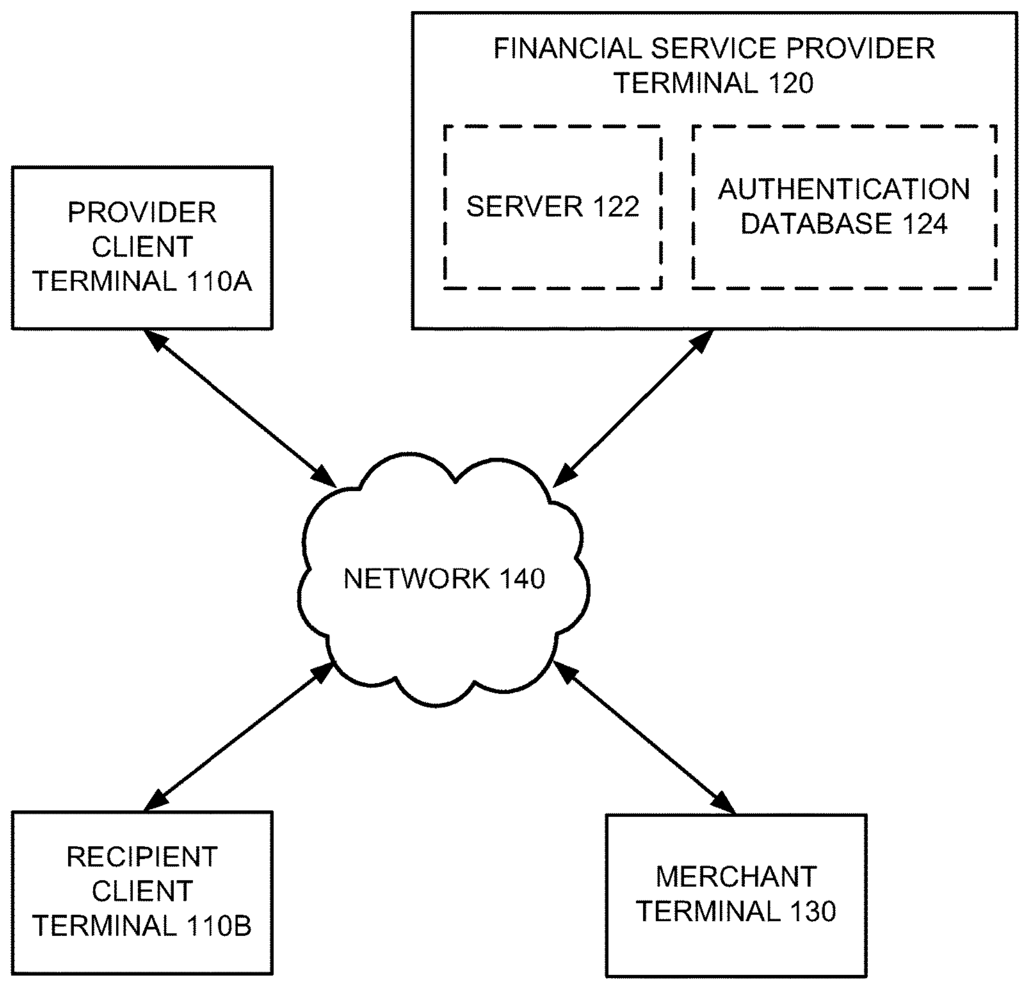
FIG. 1 is a diagram of an exemplary system that may be used for providing a redeemable commerce object.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

The disclosed embodiments are directed to systems and methods for providing a redeemable commerce object on a web page. In one aspect, a system for providing a redeemable commerce object on a web page is disclosed. Specifically, the system may include one or more memory devices storing instructions, and one or more processors configured to execute the instructions to perform steps of a method. The system may receive an object placement request from a first computing device. The object placement request may include identification data associated with a first account. The system may determine whether at least a portion of the identification data corresponds to account information data stored in an account identification database. Based on the determination, the system may activate a link to a web page configured to receive a redeemable commerce object. The system may further provide the redeemable commerce object on the web page based on the object placement request. Additionally, the system may receive an object selection request associated with the redeemable commerce object from a second computing device, which has accessed the web page via the activated link. The object selection request may include identification data associated with a second account. Finally, the system may transfer payment from the first account to the second account to redeem the commerce object based on the object selection request.

In another aspect, a system for providing a redeemable commerce object on a web page is disclosed. Specifically, the system may activate a link to a web page configured to receive one or more redeemable commerce objects. The system may also provide the one or more redeemable commerce objects on the web page, and provide the activated link to the web page to a plurality of computing devices. From a first computing device of the plurality of computing devices having accessed the web page via the activated link, the system may receive a first object selection request associated with a first redeemable commerce object of the one or more redeemable commerce objects. The first object selection request may include identification data associated with a first account. Based on the first object selection request, the system may activate the first redeemable commerce object for redemption based on the first object selection request. Finally, the system may provide the activated first redeemable commerce object to the first account based on the first object selection request.

In yet another aspect, a non-transitory computer-readable medium storing instructions is disclosed. The instructions, when executed by one or more processors, may cause a computing device to perform steps of a method for providing a redeemable commerce object on a web page. Specifically, the computing device may receive an object placement request from a first computing device. The object placement request may include identification data associated with a first account. The computing device may determine whether at least a portion of the identification data corresponds to account information data stored in an account identification database. Based on the determination, the computing device may activate a link to a web page configured to receive a redeemable commerce object. The computing device may further provide the redeemable commerce object on the web page based on the object placement request. Additionally, the computing device may receive an object selection request associated with the redeemable commerce object from a second computing device, which has accessed the web page via the activated link. The object selection request may include identification data associated with a second account. Finally, the computing device may transfer payment from the first account to the second account to redeem the commerce object based on the object selection request.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

FIG. 1 shows a diagram of an exemplary system that may be configured to perform one or more software processes that, when executed, provide a redeemable commerce object (e.g., a gift card, a monetary gift, a discount coupon, etc.) on a web page. The components and arrangements shown in FIG. 1 are not intended to limit the disclosed embodiments as the components used to implement the disclosed processes and features may vary.

In accordance with disclosed embodiments, a redeemable commerce object system 100 may include a provider client terminal 110A, a recipient client terminal 110B, a financial service provider terminal 120, and a merchant terminal 130, each communicating with a network 140. Client terminals 110A, B may be connected to financial service provider terminal 120 and merchant terminal 130 directly or via network 140. Financial service provider terminal 120 may be connected to merchant terminal 130 directly or via network 140. Other components known to one of ordinary skill in the art may be included in redeemable commerce object system 100 to process, transmit, provide, and receive information consistent with the disclosed embodiments.

Provider client terminal 110A may allow one or more potential providers to request to provide a redeemable commerce object to one or more potential recipients associated with recipient client terminal 110B. For example, a provider may request to provide a redeemable commerce object to a recipient, and wish to transfer funds via a person-to-person or peer-to-peer ("P2P") payment. A P2P payment may allow the transfer of funds from one user's account to another user's account. For example, a first user may send money from their bank account to a second user's bank account via a P2P payment. If both users have bank accounts with the same financial institution or as part of the same P2P network, the transfer of a P2P payment may be performed instantaneously at the time of initiation of the payment. If the users have bank accounts at non-participating financial institutions, the transfer of a P2P payment may be delayed. For example, financial institutions commonly require two days to post a money transfer payment upon receiving confirmation of the account details of the recipient. A P2P payment may be initiated by the provider entering identifying information of the recipient, such as the recipient's name, email address and/or account numbers. Based on the identifying information of the recipient, the system may identify an account associated with the recipient. The recipient may be required to enter some authenticating information before the transfer will be completed. The provider and recipient(s) may be any type of user, such as an online user, and may include an existing, potential, or new customer of a financial service provider or be unaffiliated with the financial service provider. Although the example of a P2P payment transfer is disclosed, the provider may provide any kind of product.

Operating in communication with network 140, each of the client terminals 110A, B may be a computer-based system. For example, each of the client terminals 110A, B may include a general purpose or notebook computer, a mobile device with computing ability, a server, a desktop computer, tablet, or any combination of these computers and/or affiliated components. Client terminals 110A, B may include one or more sensors such as a camera, a microphone, a gyroscope, and/or a GPS receiver. In one embodiment, each of the client terminals 110A, B may be a computer system or device that is operated by a user who is a customer or a potential customer of a financial service provider. In another embodiment, each of the client terminals 110A, B may be a mobile computer device that is operated by a potential customer of a financial service provider at a predetermined location or geographic area (e.g., a point-of-sale location). Each of the client terminals 110A, B may be configured with storage that stores one or more operating systems that perform known operating system functions when executed by one or more processors. By way of example, the operating systems may include Microsoft Windows™, Unix™, Linux™, Apple™ operating systems, Personal Digital Assistant (PDA) type operating systems, such as Microsoft CE™, or other types of operating systems. Accordingly, disclosed embodiments may operate and function with computer systems running any type of operating system. The client terminals 110A, B may also include communication software that, when executed by a processor, provides communications with network 140, such as Web browser software, tablet, or smart hand held device networking software, etc. Each of the client terminals 110A, B may be a device that executes mobile applications, such as a tablet or mobile device.

Financial service provider terminal 120 may allow any number of financial service providers, such as banks, credit card companies, merchants, lenders, and the like, to offer and provide redeemable commerce objects to recipients on behalf of a provider, who may be an existing, new, or potential customer. Although financial service providers may operate in the direct model, the financial service providers may be any type of financial service provider, such as a merchant selling an item to be purchased. Financial service provider terminal 120 may be a computer-based system including computer system components, such as one or more servers, desktop computers, workstations, tablets, hand held computing devices, memory devices, and/or internal network(s) connecting the components. As shown in FIG. 1, financial service provider terminal 120 may include a server 122 and/or an authentication database 124. An authentication database 124 may provide a database of credentials, such as, for example, usernames, logins, passwords, pin numbers, account numbers, security questions, and other such authentication data, that may be used to verify the identity of a user accessing the system.

Merchant terminal 130 may allow any number of merchants to provide goods or services in exchange for payment via a particular payment system. Merchants using merchant terminal 130 may include traditional brick-and-mortar retail merchants, or any type of merchant, such as an online retail merchant. Each merchant may communicate directly or indirectly with financial service provider terminal 120 in order to finalize or verify the terms of a to-be-redeemed commerce object. Merchant terminal 130 may be a computer-based system including computer system components, such as one or more servers, desktop computers, workstations, tablets, hand held computing devices, memory devices, and/or internal network(s) connecting the components.

Network 140 may comprise any type of computer networking arrangement used to exchange data. For example, network 140 may be the Internet, a private data network, or a virtual private network using a public network such as the Internet. Network 140 may also include a public switched telephone network ("PSTN") and/or a wireless network.

To communicate over network 140, a computing device associated with provider client terminal 110A, recipient client terminal 110B, financial service provider terminal 120, or merchant terminal 130 may be a mobile computing device (e.g., a smart phone, tablet computer, smart wearable device, or portable laptop computer) or a stationary computing device (e.g., a stationary desktop or laptop computer). Being mobile, in some embodiments, may advantageously allow one or more of the client terminals 110A, B to communicate with other devices in the redeemable commerce object system 100 from a predetermined location or area (e.g., at a point-of-sale location).

Figure 2:
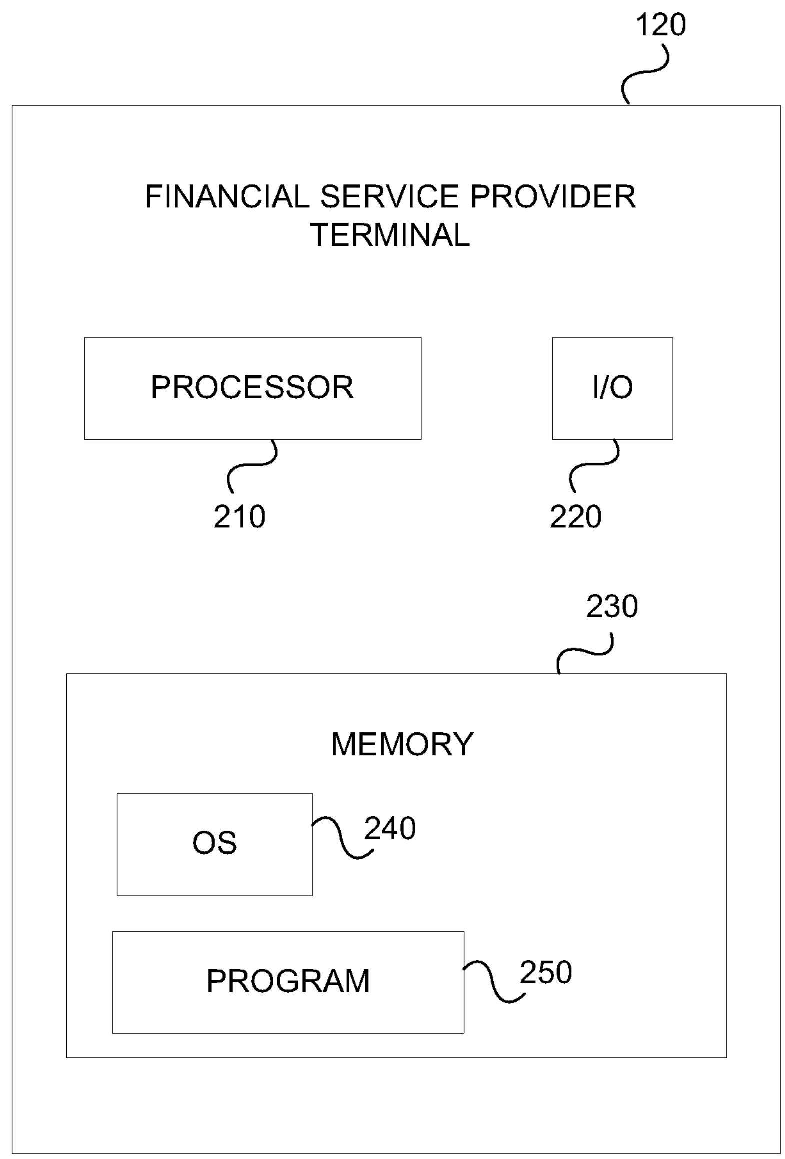
FIG. 2 is a component diagram of an exemplary financial service provider terminal.

Financial service provider terminal 120 is shown in more detail in FIG. 2. Client terminals 110A, B and merchant terminal 130 may have a similar structure and components that are similar to those described with respect to financial service provider terminal 120. As shown, financial service provider terminal 120 may include a processor 210, an input/output ("I/O") device 220, a memory 230 containing an operating system ("OS") 240 and a program 250. For example, financial service provider terminal 120 may be a single server or may be configured as a distributed computer system including multiple servers or computers that interoperate to perform one or more of the processes and functionalities associated with the disclosed embodiments. In some embodiments, the financial service provider terminal 120 may further include a display (or a display interface), a peripheral interface, a transceiver, a mobile network interface in communication with the processor 210, a bus configured to facilitate communication between the various components of the financial service provider terminal 120, and a power source 130 configured to power one or more components of the financial service provider terminal 120. A display may include any conventional display mechanism such as a flat panel display, projector, or any other display mechanism known to those having ordinary skill in the art. In some embodiments, a display, in conjunction with suitable stored instructions, may be used to implement a graphical user interface. In other embodiments, a display may include a display interface configured to receive or communicate with one or more external displays. The financial service provider terminal may further include a sound interface, a camera interface, a telephony subsystem, an antenna interface, and a GPS receiver.

A peripheral interface may include the hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth®, low-energy Bluetooth® (BLE), WiFi™, ZigBee®, ambient backscatter communications (ABC) protocols or similar technologies.

A mobile network interface may provide access to a cellular network, the Internet, or another wide-area network.

In some embodiments, a mobile network interface may include hardware, firmware, and/or software that allows the processor(s) 210 to communicate with other devices via wired or wireless networks, whether local or wide area, private or public, as known in the art. A power source may be configured to provide an appropriate alternating current (AC) or direct current (DC) to power components.

Processor 120 may include one or more of a microprocessor, microcontroller, digital signal processor, co-processor or the like or combinations thereof capable of executing stored instructions and operating upon stored data. Memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 230.

Processor 210 may be one or more known processing devices, such as a microprocessor from the Pentium™ family manufactured by Intel™ or the Turion™ family manufactured by AMD™. Processor 210 may constitute a single core or multiple core processor that executes parallel processes simultaneously. For example, processor 210 may be a single core processor that is configured with virtual processing technologies. In certain embodiments, processor 210 may use logical processors to simultaneously execute and control multiple processes. Processor 210 may implement virtual machine technologies, or other similar known technologies to provide the ability to execute, control, run, manipulate, store, etc. multiple software processes, applications, programs, etc. In another embodiment, processor 210 may include a multiple-core processor arrangement (e.g., dual or quad core) that is configured to provide parallel processing functionalities to allow server 200 to execute multiple processes simultaneously. One of ordinary skill in the art would understand that other types of processor arrangements could be implemented that provide for the capabilities disclosed herein.

Financial service provider terminal 120 may include one or more storage devices configured to store information used by processor 210 (or other components) to perform certain functions related to the disclosed embodiments. In one example, financial service provider 210 may include memory 230 that includes instructions to enable processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, financial service provider terminal 120 includes memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, financial service provider terminal 120 may include memory 230 that may include one or more programs 250 to perform one or more functions of the disclosed embodiments. Moreover, processor 210 may execute one or more programs 250 located remotely from redeemable commerce object system 100. For example, redeemable commerce object system 100 may access one or more remote programs 250, that, when executed, perform functions related to disclosed embodiments.

Memory 230 may include one or more memory devices that store data and instructions used to perform one or more features of the disclosed embodiments. Memory 230 may also include any combination of one or more databases controlled by memory controller devices (e.g., server(s), etc.) or software, such as document management systems, Microsoft SQL databases, SharePoint databases, Oracle™ databases, Sybase™ databases, or other relational databases. Memory 230 may include software components that, when executed by processor 210, perform one or more processes consistent with the disclosed embodiments.

Financial service provider terminal 120 may also be communicatively connected to one or more memory devices (e.g., databases (not shown)) locally or through a network. The remote memory devices may be configured to store information and may be accessed and/or managed by financial service provider terminal 120. By way of example, the remote memory devices may be document management systems, Microsoft SQL database, SharePoint databases, Oracle™ databases, Sybase™ databases, or other relational databases. Systems and methods consistent with disclosed embodiments, however, are not limited to separate databases or even to the use of a database.

Financial service provider terminal 120 may also include one or more I/O devices 220 that may comprise one or more interfaces for receiving signals or input from devices and providing signals or output to one or more devices that allow data to be received and/or transmitted by financial service provider terminal 120. For example, financial service provider terminal 120 may include interface components, which may provide interfaces to one or more input devices, such as one or more keyboards, mouse devices, touch screens, track pads, trackballs, scroll wheels, digital cameras, microphones, sensors, and the like, that enable financial service provider terminal 120 to receive data from one or more users (such as customer terminal 110). In other exemplary embodiments, the I/O devices 220 may serve as the sound interface and/or the camera interface to present information to a user and capture information from a device's environment including instructions from the device's user. As additional examples, input components may include an accelerometer (e.g., for movement detection), a magnetometer, a digital camera, a microphone (e.g., for sound detection), an infrared sensor, an optical sensor, and a GPS receiver.

In exemplary embodiments of the disclosed technology, the financial service provider terminal 120 may include any number of hardware and/or software applications that are executed to facilitate any of the operations. In example implementations, one or more I/O interfaces facilitate communication between the financial service provider terminal 120 and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be utilized to receive or collect data and/or user instructions from a wide variety of input devices. Received data may be processed by one or more computer processors as desired in various implementations of the disclosed technology and/or stored in one or more memory devices.

While the financial service provider terminal 120 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the terminal 120 may include a greater or lesser number of components than those illustrated.

Figure 3:
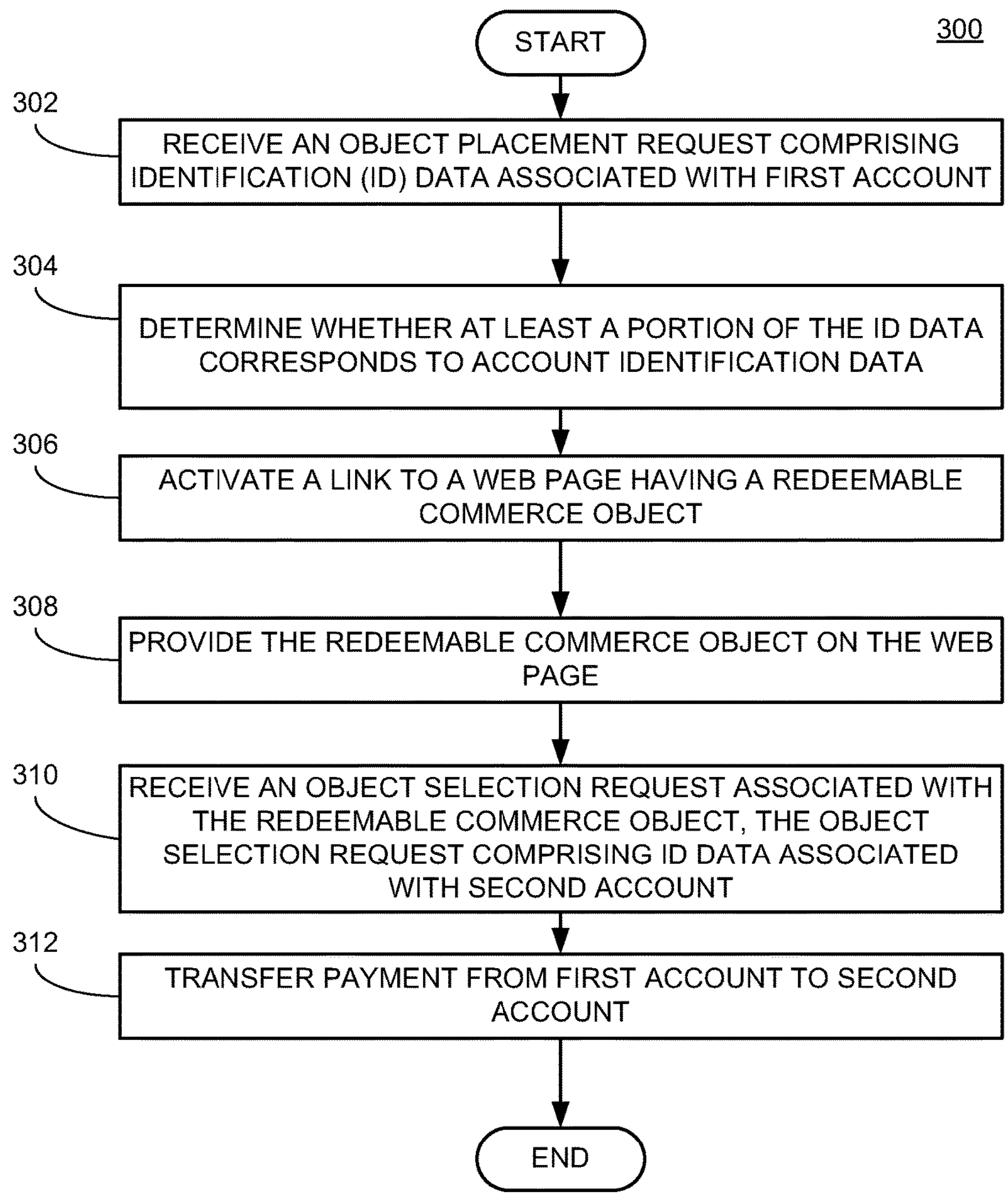
FIG. 3 is a flowchart of an exemplary method for providing a redeemable commerce object on a web page.

FIG. 3 shows a flowchart of method 300 for providing a redeemable commerce object on a web page. Method 300 may be performed by financial service provider terminal 120, or similarly be merchant terminal 130, using processor 210 to execute memory 230. Following method 300, the financial service provider may provide the recipient with a redeemable commerce object.

In block 302, financial service provider terminal 120 may receive a redeemable commerce object request from a provider (e.g., via provider client terminal 110A). A redeemable commerce object request may represent an indication of the desire of a user of the system (e.g., the user of the provider client terminal 110A) to provide a redeemable commerce object for another user (e.g., the user of the recipient client terminal 110B). According to some embodiments, a redeemable commerce object may be a link, an icon, an image, or any other such electronic representation that may be selected by a user and redeemed for value. For example, in some cases a redeemable commerce object may be redeemed for cash, a gift card, a product, or any other item of value that a provider may wish to convey to a recipient. A redeemable commerce object request may include a selection of the account the provider wishes to use to pay for the redeemable object, contact information of the recipient, a selection of a redeemable commerce object icon to represent the redeemable commerce object, a selection of the redeemable object, an embedding location (i.e., a location within a web site to place the redeemable commerce object icon), and authentication data (e.g., an answer to a question or riddle, a code or password, or a location of the recipient) that the recipient must provide (e.g., via recipient client terminal 110B) to redeem the commerce object.

In some embodiments, the object placement request may include identification data associated with a first account, such as, for example, identifying information associated with a bank account associated with the financial service provider of terminal 120, a bank account associated with a third party financial service provider, a credit card account, a gift card account, a rewards account, or any other such financial account that may be used to provide payments. Identification data associated with a first account may include a login name, password, pin, account number, or any other such data that is suitable to identify the requester. For example, the identification data may be a login and password for an online banking portal associated with a financial service provider. In some embodiments, if the requester does not possess identification data associated with a first account, such as a login to a bank account, the system may prompt the requester to sign up for an account.

In some embodiments, the redeemable commerce object request may be received by the merchant terminal 130. The merchant terminal 130 may interact with the financial service provider terminal 120 to convey the identification data associated with a first account to the financial service provider terminal 120 through an API.

In block 304, financial service provider terminal 120 may determine whether at least a portion of the identification data corresponds to account identification data stored in an account identification database. For example, the financial service provider terminal 120 may compare login credentials submitted by the provider client terminal 110A to credentials stored in an authentication database 124. Once the user of the provider client terminal 110A has been authenticated, the system may, for example, enable the user to purchase the redeemable commerce object using funds from an authenticated account, and the funds may be withdrawn at that time or later on (e.g., when the commerce object is redeemed).

Next, as shown in block 306, financial service provider terminal 120 may activate a link to a web page configured to receive a redeemable commerce object. Activation of a link may mean that the web site has become publically accessible or accessible by one or more specified users. In some embodiments, the activation of the link to the web page may occur in response to a positive determination that at least a portion of the identification data corresponds to account identification data stored in an account identification database, as described with respect to block 304. For example, once a user of the provider client terminal 110A has been authenticated such that payment using an associated account may be authorized, the link to the web page may be activated. According to some embodiments, the financial service provider terminal 120 may activate the link to the webpage. In some embodiments, a merchant terminal 130 may activate the link to the web page, in response to, for example, receiving notification from the financial service provider terminal 120 that at least a portion of the identification data corresponds to account information data stored in the account identification database. It should be understood that throughout this disclosure, it is contemplated that the web page that is configured to receive a redeemable commerce object may be hosted by either the financial service provider or a merchant, and thus, as will be understood by those of skill in the art, various steps of the methods described herein may be performed by either the financial service provider terminal 120 or the merchant terminal 130 depending on where the web page is hosted.

Once the web page link is activated, the web page link may be provided to a recipient to access the web page. For example, the web page link may be emailed to a recipient. In some embodiments, the web page or web page link may allow one or more specified recipients to access the web page. A recipient may utilize the web page link to access the web page in order to search for the redeemable commerce object.

In block 308, the redeemable commerce object may be provided to the web page based on the object placement request. The redeemable commerce object may be provided by the host of the web page, which may be either the financial service provider terminal 120 or the merchant terminal 130 (or, for example, a server associated with either), by modifying the HTML code (or other applicable code) of a web page to include the redeemable commerce object within the web page. In some embodiments, the web page may be a copy of a previously existing, public web page that has been modified to include a representation of the redeemable commerce object among the text, icons, and images of the web page. According to some embodiments, the purchaser of the redeemable commerce object (e.g., the provider) may be enabled to select the location within the web page at which the redeemable commerce object may be placed. In some embodiments, the system may automatically position the redeemable commerce object at one of a plurality of predetermined locations on the web page based on the object placement request. In some embodiments, the redeemable commerce object may be selectable, and when selected, may provide the selector (e.g., the recipient) with the capability of redeeming the redeemable commerce object. In some embodiments, a redeemable commerce object may include a plurality of separate icons, images, and/or links that may be placed at different locations within one or more web pages. In such cases, a recipient may be required to locate and select a plurality of icons, images, and/or links, answer one or more questions, and/or travel to predetermined location areas (e.g., location of a first date or wedding venue) along the way in order to redeem the redeemable commerce object. In this manner, the recipient may be challenged (e.g., by riddles or a scavenger hunt) or reminded of past events (e.g., exposed to photographs, music, and/or locations shared with the provider), for example, thereby enhancing the experience of redeeming the gift. As the provider can customize the experience for the recipient and/or reminisce on past events when providing the gift, the experience for the provider may also be enhanced.

In block 310, the host of the website (e.g., either the financial service provider terminal 120 or merchant terminal 130) may receive an object selection request associated with the redeemable commerce object, from, for example, a recipient client terminal 110B. The object selection request may constitute a request to redeem the redeemable commerce object by, for example, selecting one or more redeemable commerce object icons, images, and/or links as described above. In some embodiments, when selected, the system may cause the appearance of the redeemable commerce object to be modified. The object selection request may include identification data associated with an account of the recipient, for example, a bank account associated with the financial service provider of terminal 120, a third party bank account, a merchant account, or any other account that may be suitable for receiving the value redeemed from the redeemable commerce object.

In some embodiments, the system may authenticate the recipient in response to receiving the object selection request, by, for example, comparing a portion of the identification data associated with an account of the recipient to data stored in an authentication database (e.g., authentication database 124). For example, in some embodiments, the recipient may provide login credentials associated with the financial service provider of terminal 120. In some embodiments, a recipient may be required to enter a password or pin associated with the redeemable commerce object in order to redeem it. According to some embodiments, recipient authentication may be based on the location of the recipient. For example, in some embodiments, the recipient may be required to go to a physical location area (e.g., a particular store) in order to be enabled to redeem the redeemable commerce object. Accordingly, in some embodiments, an object selection request may include GPS coordinates of the recipient client terminal 110B which may be used by the system to authenticate the recipient's location. The system may compare the location of the recipient client terminal 110B to a predetermined location. As will be understood by those of skill in the art, this may be performed by, for example, determining whether the location of the recipient client terminal 110B is within a threshold range from a specified location or whether it is within the bounds of a specified geographic area. In alternative embodiments, RFID tags or other positioning technologies may be used to provide position data of the recipient client terminal 110B in lieu of or in addition to GPS position data.

At block 312, the system may cause the transfer of payment from the account of the provider to the account of the recipient to redeem the commerce object based on the selection request. For example, the system may cause funds to be transferred from the provider's account to the recipient's account. In some embodiments, the transfer may be a P2P transfer, as described above. In some embodiments, the transfer of payment may be predicated on the authentication of the recipient. For example, if the recipient has not been authenticated, the transfer may be blocked and the recipient may be unable to redeem the redeemable commerce object. Upon a transfer being made, the system may send a notification to the provider client terminal 110A and/or recipient client terminal 110B.

Figure 4:
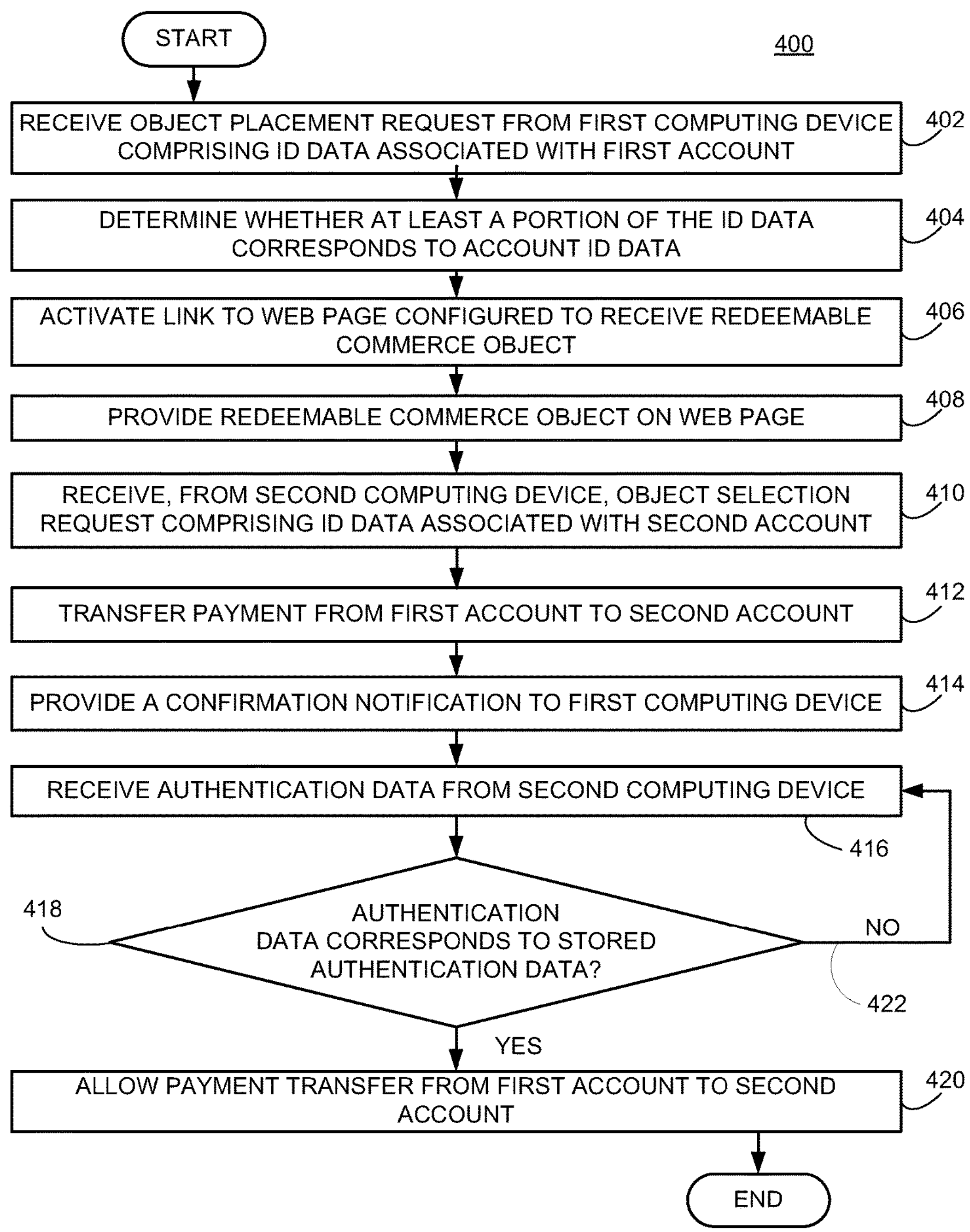
FIG. 4 is a flowchart of another exemplary method for providing a redeemable commerce object on a webpage.

FIG. 4 shows a flowchart of method 400 for providing a redeemable commerce object on a web page. Method 400 may be performed by financial service provider terminal 120, or similarly be merchant terminal 130, using processor 210 to execute memory 230. Following method 400, the financial service provider may provide the customer with a redeemable commerce object. Method 400 may include various steps that are substantially similar to steps from method 300 described above, including: receiving an object placement request from a first computing device comprising identification data associated with a first account (block 402), determining whether at least a portion of the identification data corresponds to account identification data (block 404), activating a link to a web page configured to receive a redeemable commerce object (block 406), providing the redeemable commerce object on the web page (block 408), receiving an object selection request associated with the redeemable commerce object where the object selection request includes identification data associated with a second account (block 410), and initiating a payment transfer from the first account to the second account (block 412).

At block 414, the system may provide a confirmation notification to the first computing device (e.g., provider client terminal 110A) following the initiation of a payment transfer from the first account to the second account. In some embodiments, the system may provide notification to an email account or phone number associated with the user of the provider client terminal 110A. In further embodiments, the system may allow the recipient to provide (e.g., via recipient client terminal 110B) a personalized response as part of the notification.

At block 416, the system may receive authentication data from the second computing device (e.g., the recipient client terminal 110B). As described above, this authentication data may include, for example, a pin number, a password, an answer to a question, and/or location data (e.g., GPS data) associated with the second computing device.

At block 418, the system may determine whether the authentication data from the second computing device (e.g., the recipient client terminal 110B) corresponds to stored authentication data. For example, the system may compare the received pin number to a stored pin number associated with the redeemable commerce object. In another example, the system may compare the GPS data of the second computing device to a stored location to determine whether the second computing device is within a predetermined proximity to the stored location. In yet another example, authentication data may include a username and password that may be compared to an authentication database (e.g., authentication database 124). As those of skill in the art will recognize, there may be many possible types of authentication data that may be used to authenticate a computing device or the identity of the user of a computing device and these examples are intended to be non-limiting.

At block 420, the transfer of the payment from the first account to the second account will be allowed if the authentication data received from the second computing device is authenticated. However, if the authentication data received from the second computing device is not authenticated, the method 400 may follow path 422 and return to block 416 to receive authentication data from the second computing device again. According to some embodiments, the second computing device may continue to submit authentication data until the second computing device has been authenticated. In some embodiments, the second computing device may only be able to submit incorrect authentication data a predetermined number of times, at which point the transfer of funds may be canceled and the redeemable commerce object may be no longer redeemed.

Figure 5:
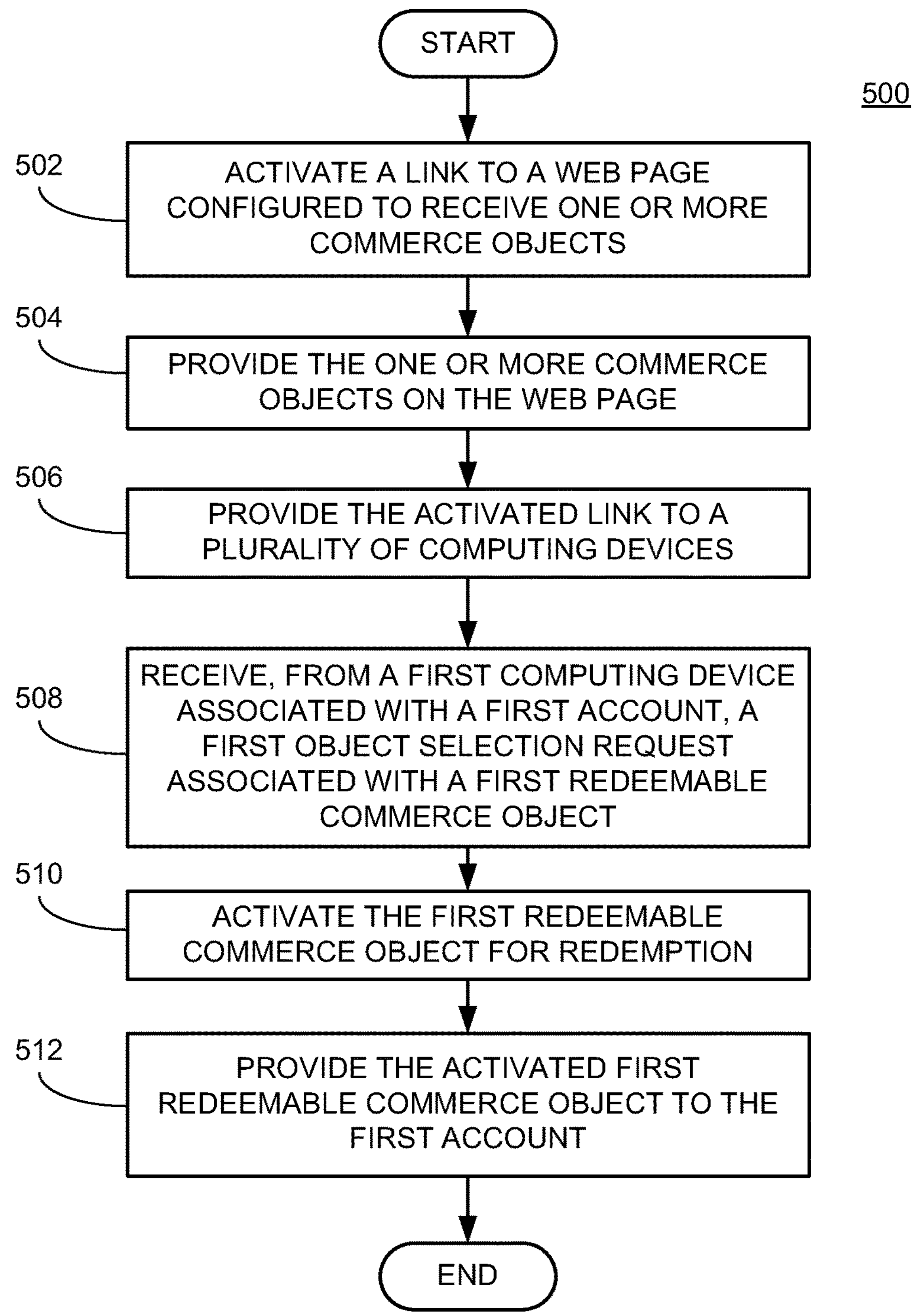
FIG. 5 is a flowchart of an exemplary method for providing a commerce object, which is redeemable by one or more of a plurality of computing devices, on a webpage.

FIG. 5 shows a flowchart of method 500 for providing a redeemable commerce object on a web page to be accessed by multiple recipients. Method 500 may be performed by financial service provider terminal 120, or similarly be merchant terminal 130, using processor 210 to execute memory 230. Following method 500, the financial service provider may provide multiple recipients with a redeemable commerce object. At block 502, a link to a web page configured to receive one or more redeemable commerce objects may be activated as previously described above. At block 504, one or more redeemable commerce objects may be provided on the web page as previously described above. At block 506, the system may provide the link to the web page to a plurality of computing devices. For example, the link may be emailed to a plurality of recipients or posted on a webpage that is accessible by a plurality of users. At block 508, the system may receive a first object selection request associated with a first redeemable commerce object of the one or more redeemable commerce objects from a first computing device of the plurality of computing devices, wherein the first computing device is associated with a first account and the first computing device accessed the web page using the link. Similar to that which has been previously described above, the first object selection request may include identification data associated with the first account. At block 510, the first redeemable commerce object may be activated for redemption based on the first object selection request, by, for example, receiving an indication that the redeemable commerce object has been selected by a user of the first computing device. At block 512, the first redeemable commerce object may be provided to the first account based on the first object selection request. For example, funds, discounts, or other value may be transferred into the first account in response to receiving the first object selection request.

Figure 6:
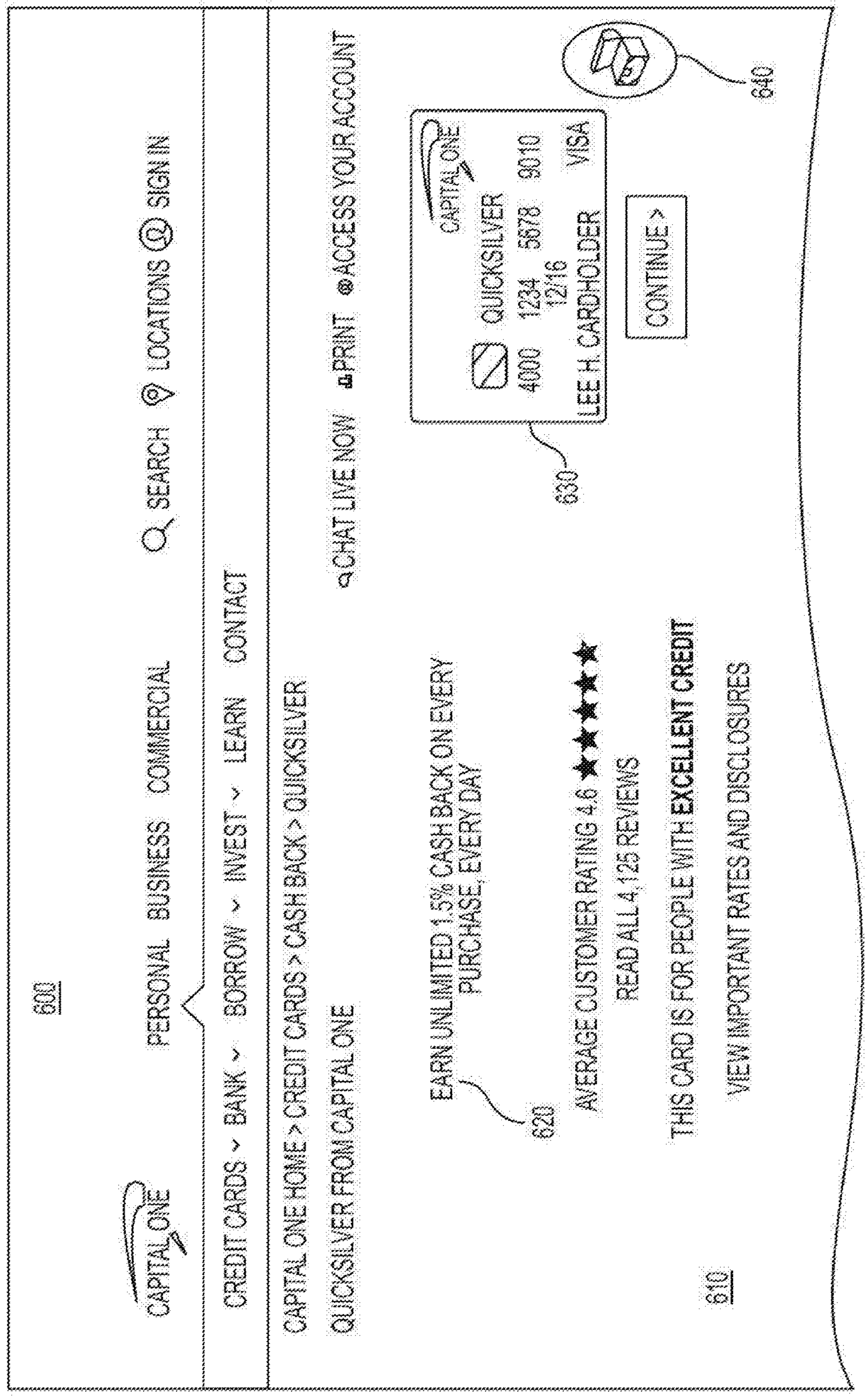
FIG. 6 shows a commerce object icon on a webpage in accordance with an exemplary embodiment.

FIG. 6 shows an example web page 600 including a redeemable commerce object 640. The web page 600 may include a background layer 610. On top of the background layer 610, the web page 600 may include text 620 and icons 630. As shown, the redeemable commerce object 640 may be an icon such as a treasure chest that is "hidden" on the web page among the previously existing text 620 and icons 630. It is contemplated that, in some embodiments, the redeemable commerce object 640 may only become visible after an action by a viewer of the webpage (e.g., scrolling over the object 640, entering a required code, providing location data corresponding to a predetermined location via the recipient's device, etc.). In some embodiments, the web page 600 may be privately accessible copy of a public web page that has been modified to include the redeemable commerce object 640. According to some embodiments, the redeemable commerce object 640 may be a selectable icon and the commerce object associated with it may be redeemed by a user locating it within the web page and selecting the redeemable commerce object 640.

Exemplary Use Case

The following exemplary use case describes one example of a typical user flow pattern. It is intended solely for explanatory purposes and not in limitation. In this example, a provider may desire to give a gift to a recipient using the system described herein. The provider may access the system and place a request to purchase or claim a redeemable commerce object ("treasure"). The request may include the type of treasure the purchaser wishes to buy (e.g., a gift card, cash, a game, a product, a photograph, a dinner or event, etc.) as well as an icon to represent the treasure. The purchaser may enter their account information, such as bank account information, to enable the purchase of the treasure. In response to the request to purchase the treasure, a unique web page containing the treasure icon may be created by the system (or an existing web page may be updated to contain the treasure icon). The web page may be a copy of a publically accessible webpage that has been modified to include the treasure somewhere within the web page. In some embodiments, the system may allow the purchaser to select where the object will be "hidden" within the web page. In some embodiments, the system may automatically "hide" the treasure on the web page.

After the web page has been created (e.g., a link to a web page including the treasure has been created), a link may be sent to the recipient to access the page. The recipient may view the page by accessing the link and may hunt for the treasure icon within the page. Upon locating the treasure icon, the recipient may redeem the commerce object by, for example, selecting the treasure icon and providing authenticating information. For example, the recipient may enter their name, username, account number, pin number, or provide their location (or the recipient's device may provide this information automatically) in order to authenticate themselves. If the recipient does not have an account with the financial service provider, the system may prompt the recipient to create an account in order to redeem the treasure or allow the recipient to designate an external account with another financial service provider or a merchant. Once the recipient has been authenticated, the treasure may be redeemed, and a transfer of commerce value (e.g., funds, discounts, etc.) may occur from the purchaser's account to the recipient's account. Meanwhile, the provider may enjoy the experience of creating a customized experience for the recipient, and the recipient may enjoy the customized experience to redeem the treasure. In this manner, a merely monetary gift (e.g., down-payment on a first car to a child) may be enhanced into an experience as well (e.g., viewing photographs of old birthdays, traveling to particular locations as a scavenger hunt, etc.)

For convenience and ease of discussion, implementations of the disclosed technology are described above in connection with a financial or banking account associated with a user. It is to be understood that the disclosed implementations are not limited to financial service provider or banking accounts and are applicable to various other accounts associated with a user's sensitive information (e.g., utility/service accounts, medical information, and various other sensitive information).

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system for providing a redeemable commerce object on a web page, comprising:

one or more memory devices storing instructions; and one or more processors configured to execute the instructions to:

receive, by the one or more processors and over a network, an object placement request from a first computing device, the object placement request comprising identification data associated with a first account;

determine, by the one or more processors, whether at least a portion of the identification data corresponds to account identification data stored in an account identification database;

modify, by the one or more processors and based on the determination and in response to the object placement request, a web page to include a representation of the redeemable commerce object, the redeemable commerce object being located within the web page based on the object placement request, wherein the web page is modified such that the representation of the redeemable commerce object is made visible within a rendering of the web page when a selector is scrolled over the location within the web page at which the representation of the redeemable commerce object is located;

activate, by the one or more processor, a link to the web page;

receive, by the one or more processor and over the network, an object selection request associated with the redeemable commerce object from a second computing device, the second computing device having accessed the web page via the activated link, the object selection request comprising identification data associated with a second account; and transfer, by the one or more processors, payment from the first account to the second account to redeem the commerce object based on the object selection request.

2. The system of claim 1, wherein the one or more processors are further configured to execute the instructions to transmit, over the network, a confirmation notification to the first computing device based on the transferred payment.

3. The system of claim 1, wherein the one or more processors are further configured to execute the instructions to:

receive, over the network, authentication data from the second computing device;

determine whether the authentication data corresponds to stored authentication data to authenticate the second computing device; and block the payment transfer from the first account to the second account until the second computing device is authenticated.

4. The system of claim 3, wherein the second computing devices comprises a global positioning system module configured to determine a location of the second computing device, and the one or more processors receive location data corresponding to the determined location of the second computing device as the authentication data.

5. The system of claim 4, wherein the instructions to authenticate the second computing device further cause the one or more processors to determine whether the received location data matches a predetermined location area.

6. The system of claim 3, wherein the one or more processors are further configured to execute the instructions to modify the redeemable commerce object on the web page based on the object placement request.

7. The system of claim 3, wherein the instructions to provide the redeemable commerce object on the web page further cause the one or more processors to position the redeemable commerce object at one of a plurality of predetermined locations on the web page based on the object placement request.

8. The system of claim 1, wherein the one or more processors are further configured to execute the instructions to modify the web page such that the representation of the redeemable commerce object is visually hidden within a rendering of the web page.

9. A system for providing a redeemable commerce object on a web page, comprising:

one or more memory devices storing instructions; and one or more processors configured to execute the instructions to:

modify, by the one or more processors and in response to an object placement request received over a network, a web page to include a representation of one or more redeemable commerce objects, the redeemable commerce objects being located within the web page based on the object placement request, wherein the web page is modified to be a privately accessible modified copy of a publicly accessible web page;

activate, by the one or more processors, a link to the web page;

send, by the one or more processors over the network, the activated link to the web page to a plurality of computing devices;

receive, by the one or more processors over the network, a first object selection request associated with a first redeemable commerce object of the one or more redeemable commerce objects from a first computing device of the plurality of computing devices, the first computing device having accessed the web page via the activated link, the first object selection request comprising identification data associated with a first account;

activate, by the one or more processors, the first redeemable commerce object for redemption based on the first object selection request; and provide, by the one or more processors, the activated first redeemable commerce object to the first account based on the first object selection request.

10. The system of claim 9, wherein the one or more processors being configured to execute the instructions to:

receive, over the network, a second object selection request associated with a second redeemable commerce object of the one or more redeemable commerce objects from a second computing device of the plurality of computing devices, the second computing device having accessed the web page via the activated link, the second object selection request comprising identification data associated with a second account;

activate the second redeemable commerce object for redemption based on the second object selection request; and provide the activated second redeemable commerce object to the second account based on the second object selection request.

11. The system of claim 9, wherein the one or more processors are further configured to execute the instructions to:

receive, over the network, first authentication data from the first computing device;

determine whether the first authentication data corresponds to stored authentication data to authenticate the first computing device; and block the activation of the first redeemable commerce object, in response to the first object selection request, until the first computing device is authenticated.

12. The system of claim 11, wherein the one or more processors being are further configured to execute the instructions to, after blocking the activation of the first redeemable commerce object in response to the first object selection request from the first computing device:

receive, over the network, a second object selection request associated with the first redeemable commerce object from a second computing device of the plurality of computing devices, the second computing device having accessed the web page via the activated link, the second object selection request comprising identification data associated with a second account;

activate the first redeemable commerce object in response to the second object selection request from the second computing device; and provide the activated first redeemable commerce object to the second account based on the second object selection request.

13. The system of claim 11, wherein the first computing device comprises a global positioning module configured to determine a location of the first computing device, and the one or more processors receive location data corresponding to the determined location of the first computing device as the first authentication data.

14. The system of claim 9, wherein the first redeemable commerce object comprises a discount coupon that requires activation prior to redemption.

15. A non-transitory computer-readable medium storing instructions that, when executed by one or more processors, cause a computing device to:

receive, by the one or more processors and over a network, an object placement request from a first computing device, the object placement request comprising identification data associated with a first account;

determine, by the one or more processors, whether at least a portion of the identification data corresponds to account identification data stored in an account identification database;

modify, by the one or more processors and based on the determination and in response to the object placement request, a web page to include a representation of the redeemable commerce object, the redeemable commerce object being located within the web page based on the object placement request, wherein the one or more processors modify the web page by copying a visual layout of a publicly accessible web page and inserting the representation of the redeemable commerce object in a location of the visual layout based on the object placement request;

activate, by the one or more processors, a link to the web page configured to receive a redeemable commerce object based on the determination;

receive, by the one or more processors and over a network, an object selection request associated with the redeemable commerce object from a second computing device, the second computing device having accessed the web page via the activated link, the object selection request comprising identification data associated with a second account; and transfer, by the one or more processors and over a network, payment from the first account to the second account to redeem the commerce object based on the object selection request.

16. The non-transitory computer-readable medium of claim 15, further storing instructions that, when executed by one or more processors, cause the computing device to provide a confirmation notification to the first computing device based on the transferred payment.

17. The non-transitory computer-readable medium of claim 16, wherein the second computing devices comprises a global positioning system module configured to determine a location of the second computing device, and the one or more processors receive location data corresponding to the determined location of the first computing device as the authentication data.

18. The non-transitory computer-readable medium of claim 16, further storing instructions that, when executed by one or more processors, cause the computing device to modify the redeemable commerce object on the web page based on the object placement request.

19. The non-transitory computer-readable medium of claim 16, wherein the instructions to provide the redeemable commerce object on the web page further cause the computing device to position the redeemable commerce object at one of a plurality of predetermined locations on the web page based on the object placement request.

20. The non-transitory computer-readable medium of claim 15, further storing instructions that, when executed by one or more processors, cause the computing device to:

receive, over the network, authentication data from the second computing device;

determine whether the authentication data corresponds to stored authentication data to authenticate the second computing device; and block the payment transfer from the first account to the second account until the second computing device is authenticated.

21. The non-transitory computer-readable medium of claim 20, wherein the instructions to authenticate the second computing device further cause the computing device to determine whether the received location data matches a predetermined location area.

* * * * *